United States Patent
Hamasaki

(10) Patent No.: US 10,302,513 B2
(45) Date of Patent: May 28, 2019

(54) TENSION MEASUREMENT DEVICE

(71) Applicant: BANDO CHEMICAL INDUSTRIES, LTD., Kobe-shi, Hyogo (JP)

(72) Inventor: Yuta Hamasaki, Hyogo (JP)

(73) Assignee: BANDO CHEMICAL INDUSTRIES, LTD., Hyogo (JP)

( * ) Notice: Subject to any disclaimer, the term of this patent is extended or adjusted under 35 U.S.C. 154(b) by 0 days.

(21) Appl. No.: 16/026,781

(22) Filed: Jul. 3, 2018

(65) Prior Publication Data

US 2018/0328803 A1 Nov. 15, 2018

Related U.S. Application Data

(63) Continuation of application No. PCT/JP2016/004472, filed on Oct. 4, 2016.

(30) Foreign Application Priority Data

Jan. 28, 2016 (JP) .................................. 2016-014166

(51) Int. Cl.
G01L 5/00 (2006.01)
G01L 5/10 (2006.01)
G01D 11/06 (2006.01)

(52) U.S. Cl.
CPC .............. G01L 5/107 (2013.01); G01D 11/06 (2013.01)

(58) Field of Classification Search
CPC ................................ G01D 11/06; G01L 5/107

USPC .................................................... 73/862.474
See application file for complete search history.

(56) References Cited

U.S. PATENT DOCUMENTS

| | | | |
|---|---|---|---|
| 4,396,187 A * | 8/1983 | Landa | B65H 7/02 271/258.01 |
| 4,699,606 A | 10/1987 | Whitley, Jr. et al. | |
| 4,846,000 A | 7/1989 | Steinseifer | |
| 7,874,509 B2 * | 1/2011 | Kenney | B26F 3/002 242/563 |
| 2016/0089872 A1 * | 3/2016 | Jang | B65H 20/02 101/492 |
| 2017/0087898 A1 * | 3/2017 | Iesaki | B65H 7/02 |

FOREIGN PATENT DOCUMENTS

| | | |
|---|---|---|
| DE | 3637922 A1 | 5/1988 |
| DE | 102015007995 A1 | 12/2015 |
| JP | S61-264233 A | 11/1986 |
| JP | S62-9245 A | 1/1987 |
| JP | H8-184512 A | 7/1996 |
| JP | H9-5181 A | 1/1997 |
| JP | 2005-98739 A | 4/2005 |

* cited by examiner

*Primary Examiner* — Max H Noori
(74) *Attorney, Agent, or Firm* — Maschoff Brennan

(57) ABSTRACT

A tension measurement device includes: a pair of rotatable first support rollers; a pressing portion arranged to face a midpoint between the pair of first support rollers; and a load cell capable of measuring a load applied to the pressing portion, and is capable of measuring a tension by clamping a lashing belt between the pair of first support rollers and the pressing portion. A pair of rotatable second support rollers is arranged to face the pair of first support rollers.

13 Claims, 10 Drawing Sheets

TENSION MEASUREMENT DEVICE

This is a continuation of International Application No. PCT/JP2016/004472 filed on Oct. 4, 2016, which claims priority to Japanese Patent Application No. 2016-014166 filed on Jan. 28, 2016. The entire disclosures of these applications are incorporated by reference herein.

BACKGROUND

The present disclosure relates to a tension measurement device capable of measuring a tension of a measurement target such as a belt by clamping the measurement target between a pair of support rollers and a pressing portion.

Tension meters have been known from, for example, Japanese Unexamined Patent Publication Nos. H8-184512 and H9-5181. The known tension meter includes: a detection contact which is arranged at a center; guide contacts which are respectively arranged on both sides of the detection contact; a first support which is arranged rearward of the detection contact and supports the detection contact via a load detector; a second support which is arranged rearward of the guide contacts, supports the guide contacts, and is movably engaged with the first support via an engagement means; and a contact-displacing means which moves the first and second supports relative to each other, and switches the detection and guide contacts between an open position which allows insertion of a long object and a clamping position which enables the long object to be clamped. A tension is determined with this tension meter in the following manner: the detection and guide contacts are brought into the clamping position and caused to clamp the long object; the load detector detects a component of force of a tension generated by bending of the long object on the contact at the center; and the tension is calculated.

SUMMARY

However, in the known tension measurement device, as shown in, for example, FIGS. 10 and 11, a belt contact angle $\theta 1$ formed when a thin belt 103 is clamped between the detection contact (pressing portion) 101 and the pair of guide contacts (first support rollers) 102 significantly differs from a belt contact angle $\theta 2$ formed when a thick belt 104 is clamped ($\theta 2 > \theta 1$). Therefore, even if the tension is the same in both cases of the thin and thick belts, different axial loads F1 and F2 are applied (F2>F1). To avoid such an axial load difference, it is necessary to adjust the layout in accordance with the thickness of a belt, by replacing the first support rollers 102 with other support rollers having a different outer diameter, by interposing a shim or any other suitable object, or by other means.

In view of the foregoing problem, it is therefore an object of the present disclosure to make it possible to accurately measure a tension irrespective of difference in thickness of measurement targets.

To achieve the above object, the present disclosure is configured such that a contact angle that a pressing portion forms with respect to a respective measurement target does not vary significantly, regardless of difference in thickness of the measurement targets.

Specifically, a first aspect of the present disclosure is directed to a tension measurement device. The tension measurement device includes: a pair of rotatable first support rollers; a pressing portion arranged to face a midpoint between the pair of first support rollers; and a load cell capable of measuring a load applied to the pressing portion. The tension measurement device is capable of measuring a tension of a measurement target by clamping the measurement target between the pair of first support rollers and the pressing portion.

Further, in the tension measurement device, a pair of rotatable second support rollers is arranged to face the pair of first support rollers.

In this configuration, the pair of second support rollers is arranged to face the pair of first support rollers supporting the measurement target, and the measurement target is clamped between the pair of first support rollers and the pair of second support rollers. As a result, the contact angle is less likely to vary even when the measurement targets having different thicknesses are measured, and variation in tension can be reduced.

A second aspect of the present disclosure is an embodiment of the first aspect. In the second aspect, the pressing portion protrudes, with respect to a phantom line connecting the pair of second support rollers to each other, toward the pair of first support rollers, and a positional relationship between the pressing portion and the pair of second support rollers is constant.

In this configuration, making the pressing portion protrude toward the pair of first support rollers by a suitable distance enables measurement of a tension based on a component of force applied to the pressing portion. Since the positional relationship between the pressing portion and the pair of second support rollers is constant, the contact angle that the pressing portion forms with respect to the measurement target varies little even when measurement targets having different thicknesses are measured. Thus, the tension of the measurement targets can be measured accurately. Here, "constant" as used herein does not mean that the positional relationship cannot be changed at all, but includes a case where the positional relationship is possibly changed and then kept constant.

A third aspect of the present disclosure is an embodiment of the second aspect. In the third aspect, the pair of first support rollers is rotatably supported in a first casing, the pair of second support rollers is rotatably supported in a second casing, and the tension measurement device is capable of measuring the tension of the measurement target by clamping the measurement target between the first and second casings.

In this configuration, since it is unnecessary to pass the measurement target between the rollers, a user can easily measure the tension by clamping the measurement target between the first and second casings, while the measurement target remains in use.

A fourth aspect of the present disclosure is an embodiment of the third aspect. In the fourth aspect, the pair of first support rollers is rotatably supported on roller-supporting members which are provided inside the first casing and movable with respect to the pair of second support rollers.

In this configuration, the pair of first support rollers presses the measurement target with a suitable force. Therefore, even if the tension varies during the measurement to deform the measurement target, the deformation of the measurement target is reduced in the vicinity of the pressing portion, and consequently, variation in tension which may be caused by the deformation is reduced.

A fifth aspect of the present disclosure is an embodiment of the third or fourth aspect. In the fifth aspect, the first and second casings are coupled to each other via a hinge portion such that the first and second casings can be opened and closed, a clamping rod is pivotably mounted to one of the first casing or the second casing, and a rod housing is provided for the other of the first casing or the second casing, the rod housing being configured to house the clamping rod when the first and second casings are closed.

In this embodiment, the clamping rod allows the first and second casings to clamp the measurement target with a suitable force.

A sixth aspect of the present disclosure is an embodiment of any one of the third to fifth aspects. In the sixth aspect, the measurement target is a lashing belt, and the tension measurement device is capable of measuring a tension of the lashing belt by clamping the lashing belt between the first and second casings, while the lashing belt remains tightened to hold an object still.

With this configuration, the user can measure the tension of the lashing belt, while tightening the lashing belt. This makes the tension control easy.

A seventh aspect of the present disclosure is an embodiment of any one of the third to sixth aspects. In the seventh aspect, the second casing has a display portion which is capable of displaying a result of measurement carried out by the load cell, and an operation portion through which the load cell is caused to carry out the measurement.

With this configuration, the user can easily perform measurement with the portable tension measurement device, while using the operation portion and watching the display portion.

An eighth aspect of the present disclosure is an embodiment of the seventh aspect. In the eighth aspect, the first or second casing is capable of housing a battery which supplies power to the load cell, the display portion, and a calculator configured to calculate the tension of the measurement target from a value obtained by the load cell.

Since this configuration does not require external electric power, the user can easily carry out tension measurement.

As can be seen from the foregoing, the present disclosure in which the pair of rotatable second support rollers is arranged to face the pair of first support rollers makes it possible to accurately measure a tension irrespective of difference in thickness of measurement targets.

DETAILED DESCRIPTION

Figure 1:
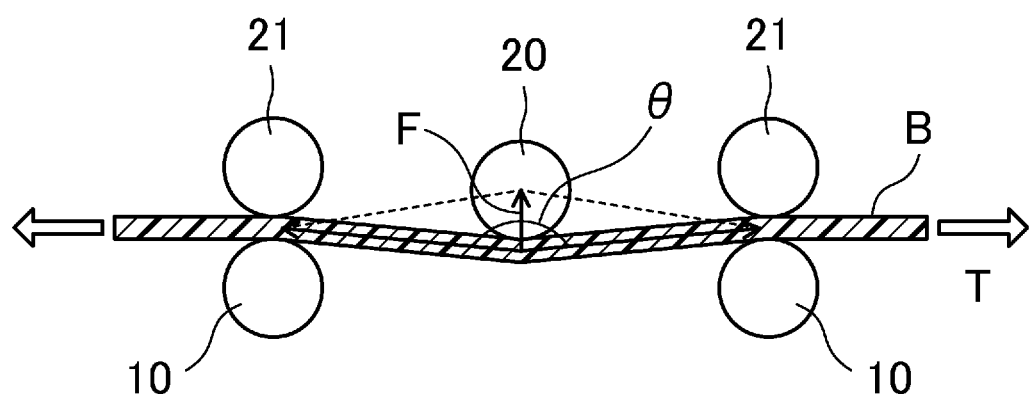
FIG. 1 is a schematic view illustrating a positional relationship between first support rollers, second support rollers, and a pressing portion of a tension measurement device according to an embodiment of the present disclosure.

Embodiments of the present disclosure will now be described with reference to the drawings.

FIGS. 1 to 8 illustrate a tension measurement device 1 of an embodiment of the present disclosure. The tension measurement device 1 includes a first casing 3 and a second casing 4 coupled to each other such that the first and second casings 3 and 4 can be opened and closed about a hinge portion 2. The hinge portion 2 may have any common hinge structure.

Figure 9:
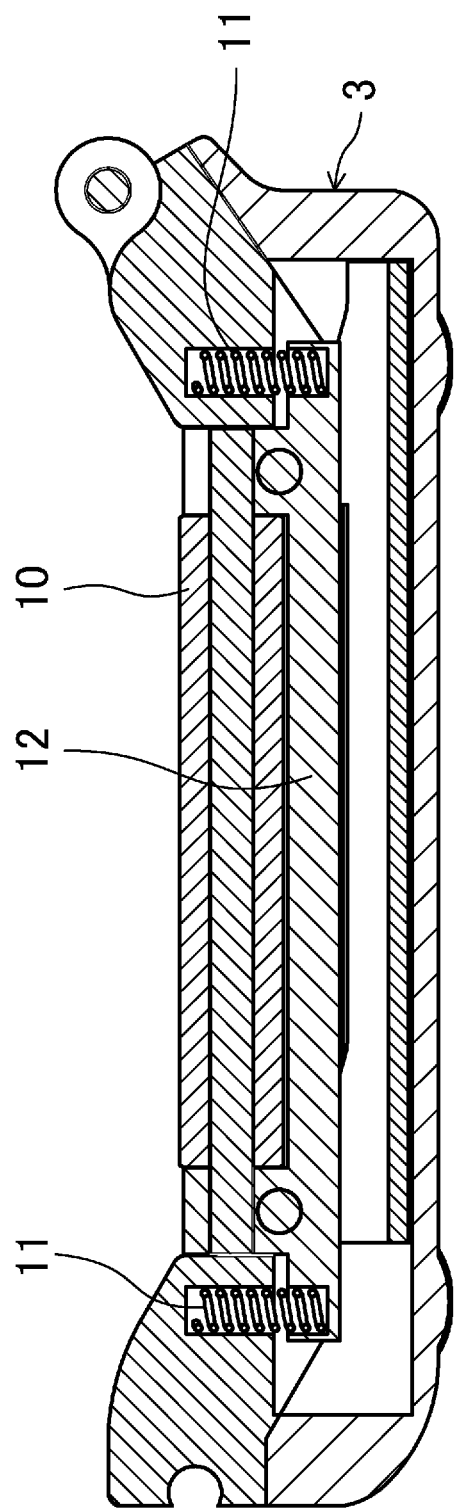
FIG. 9 is a cross-sectional view taken along line IX-IX of FIG. 5.

A pair of rotatable first support rollers 10 is provided in the first casing 3. For example, the first support rollers 10 have an outer diameter of 12 mm, and extend parallel to each other with a spacing of 40 mm interposed therebetween. Each first support roller 10 may be made of a metal or a resin, and is rotatably supported at both ends in the first casing 3. As illustrated in FIG. 9, each of the pair of first support rollers 10 is rotatably supported on an associated one of plate-like roller-supporting members 12. The roller-supporting members 12 are biased toward the second casing 4 by a pair of compression coil springs 11 provided in the first casing 3, and are movable in the vertical direction within the first casing 3. Although not illustrated in detail, the roller-supporting members 12 can be moved upward and downward through operation of a tightness-adjusting portion 13 provided for the first casing 3.

In the second casing 4, a pressing portion 20 is arranged to face a midpoint between the pair of first support rollers 10. The pressing portion 20 may be configured as a rotatable roller. In this embodiment, however, the pressing portion 20 is a non-rotatable portion with a curved surface defining, for example, the same outer diameter (12 mm) as that of the first support roller 10, and is made of, for example, a smooth resin or metal material.

In the second casing 4, a pair of rotatable second support rollers 21 are arranged to face the pair of first support rollers 10, and extend parallel to each other with the pressing portion 20 sandwiched therebetween. For example, each second support roller 21 is a roller having the same outer diameter (12 mm) as that of the first support roller 10. The second support rollers 21 extend with a spacing of, for example, 40 mm, interposed therebetween, and are each rotatably supported at both ends in the second casing 4.

Figure 8:
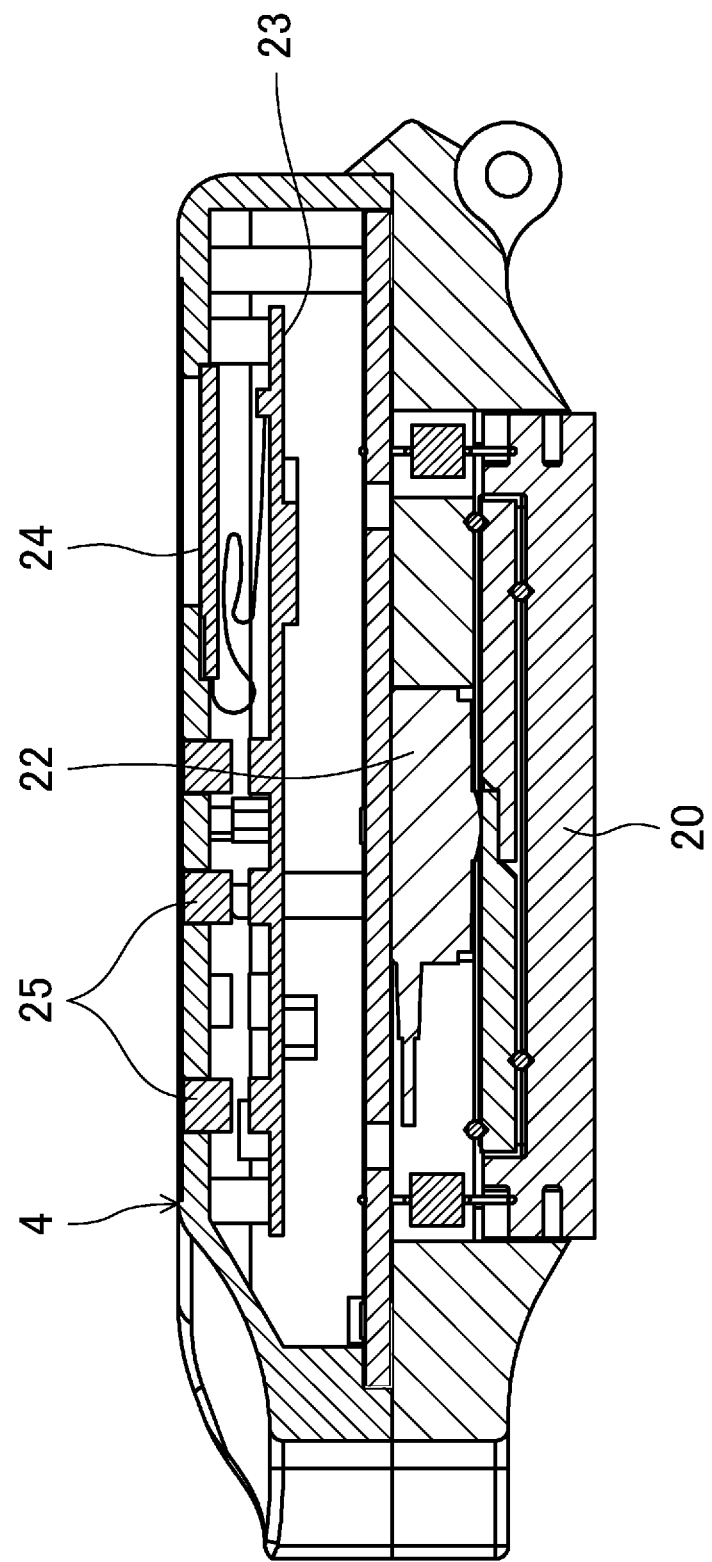
FIG. 8 is a cross-sectional view taken along line VIII-VIII in FIG. 6.

As illustrated in FIG. 8, the second casing 4 incorporates therein a load cell 22 which is capable of measuring a load applied to the pressing portion 20. The load cell 22 is connected to a circuit board 23 provided inside the second casing 4. Further, the second casing 4 has a display portion 24 which is capable of displaying a result of measurement carried out by the load cell 22, and an operation portion 25 through which the load cell 22 is caused to carry out the measurement. The display portion 24 and the operation portion 25 are connected to the circuit board 23 functioning as a calculator.

In addition, the second casing 4 is capable of housing a battery (not shown) for supplying power to the load cell 22, the display portion 24, and the circuit board 23. Note that this battery may be provided in the first casing 3.

Having this configuration, the tension measurement device 1 is capable of measuring a tension of a measurement target by clamping the measurement target between the pair of first support rollers 10 and the pressing portion 20. The measurement target is, for example, a lashing belt B. Such lashing belts B have different widths and thicknesses depending on objects to be lashed (object to be transported) on the deck of a ship or the like.

In the tension measurement device 1, the pair of rotatable second support rollers 21 are arranged to face the pair of first support rollers 10.

As illustrated in FIG. 1, the pressing portion 20 protrudes, with respect to a phantom line connecting the pair of second support rollers 21 to each other, toward the pair of first support rollers 10 by a distance of, for example, 1.4 mm. It is necessary to set this distance as appropriate, avoiding an excessive increase, in order to hinder the tension from decreasing when the tension measurement device 1 is removed after measurement. This configuration makes the positional relationship between the pressing portion 20 and the pair of second support rollers 21 constant. It is also possible to configure the pressing portion 20 such that the distance by which the pressing portion 20 protrudes toward the pair of first support rollers 10 is variable. In this case, once the distance is changed, the positional relationship between the pair of second support rollers 21 and the pressing portion 20 may be kept constant until the next change is made to the distance. Further, it is also possible to provide an SD card cassette (not shown) for the circuit board 23 so that the measurement results of the load cell 22 can be stored in, and extracted from, for example, an SD card 26 (shown in FIGS. 4 and 7). This facilitates the data processing.

Figure 2:
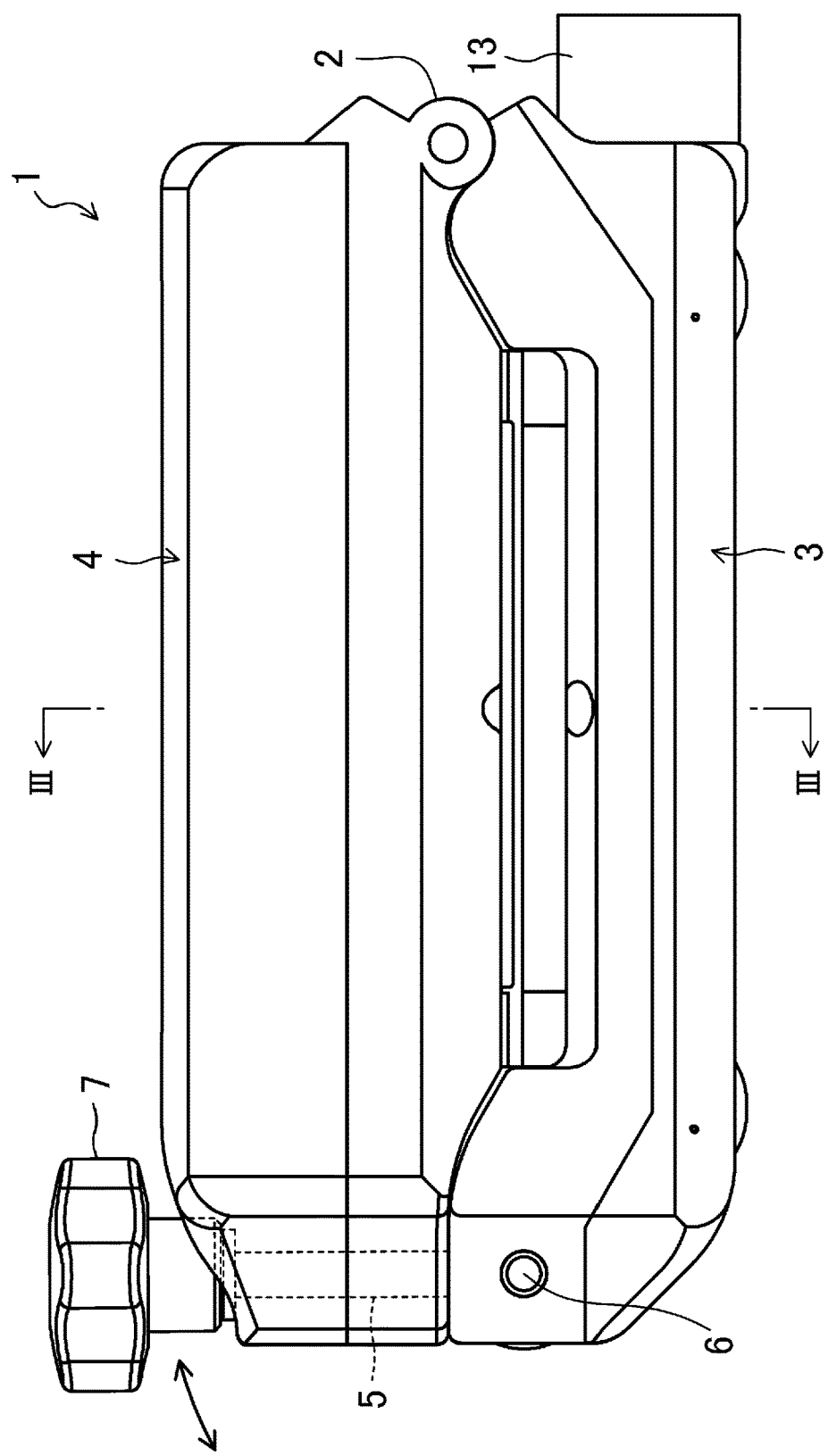
FIG. 2 is a front view of the tension measurement device.
Figure 3:
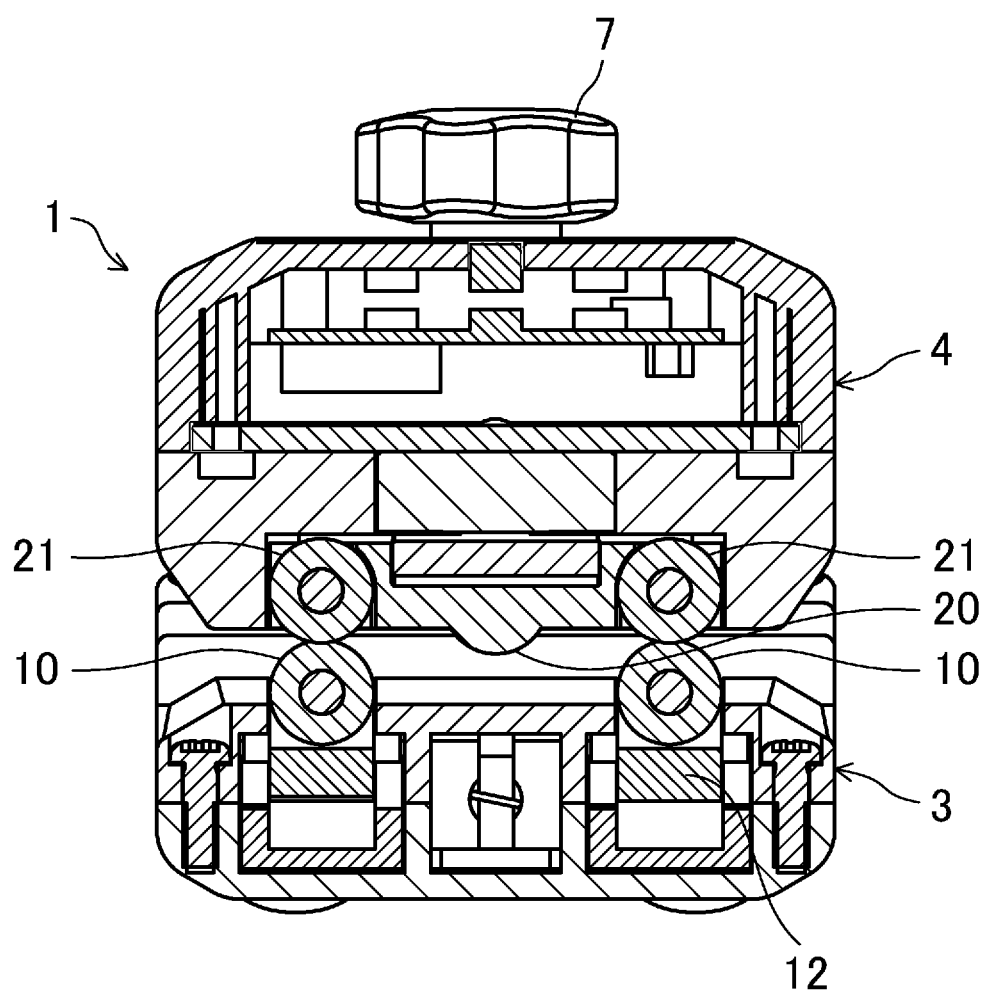
FIG. 3 is a cross-sectional view taken along line in FIG. 2.
Figure 4:
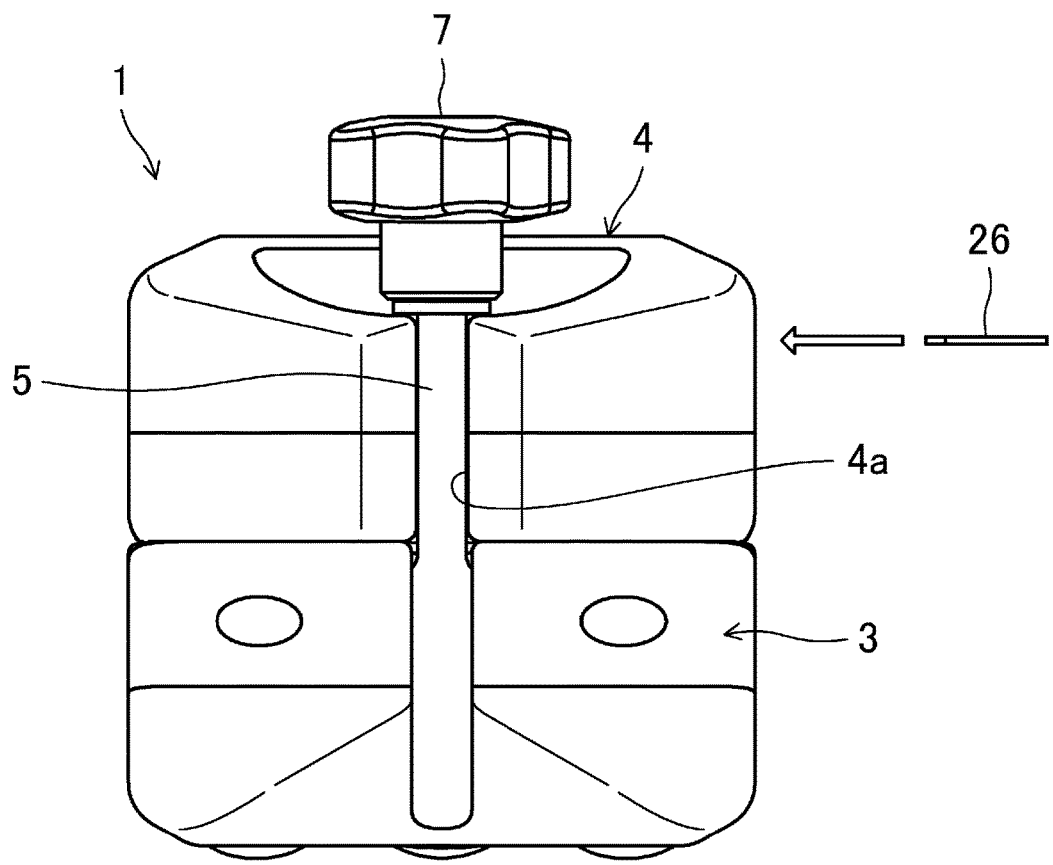
FIG. 4 is a left side view of the tension measurement device.
Figure 5:
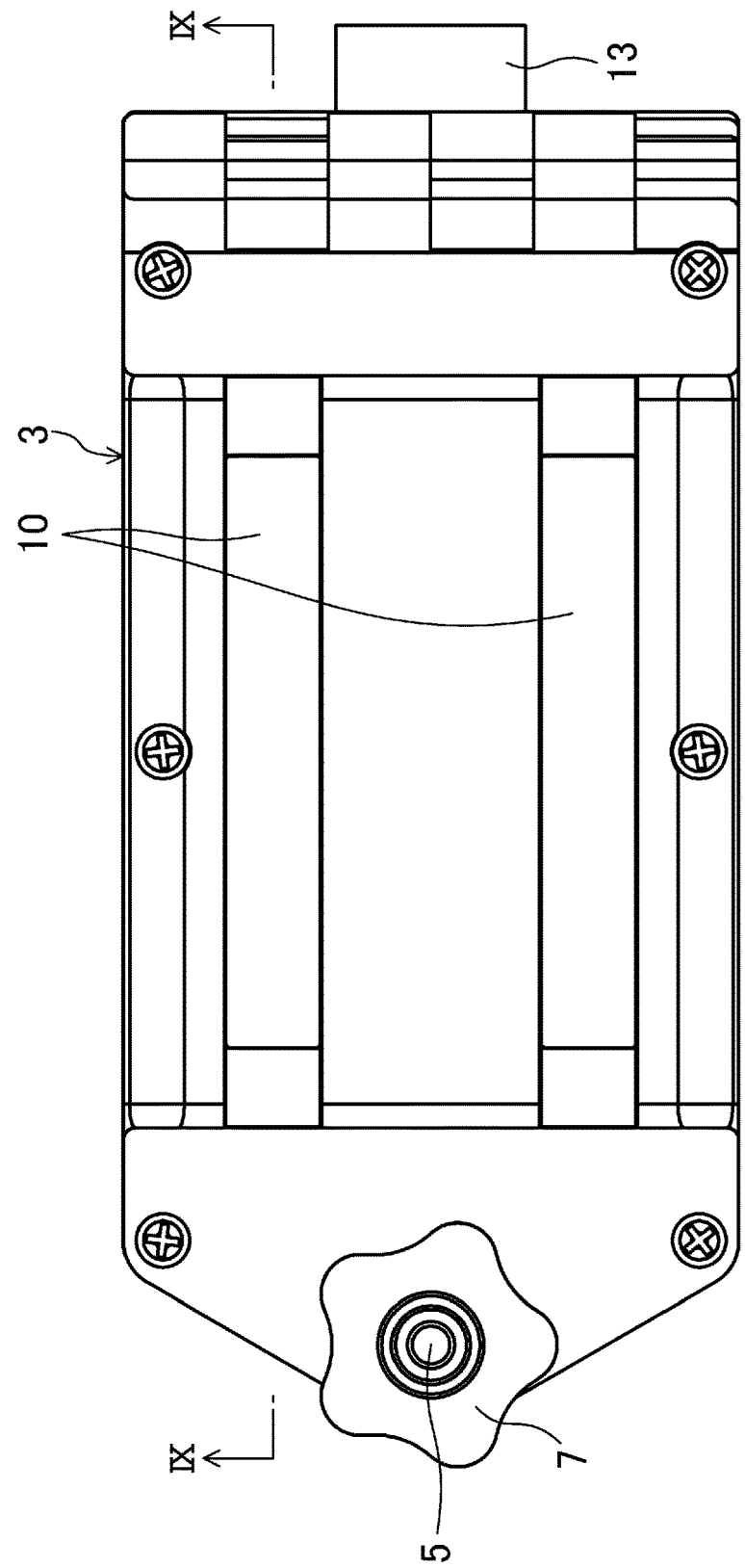
FIG. 5 is a plan view of a first casing.
Figure 6:
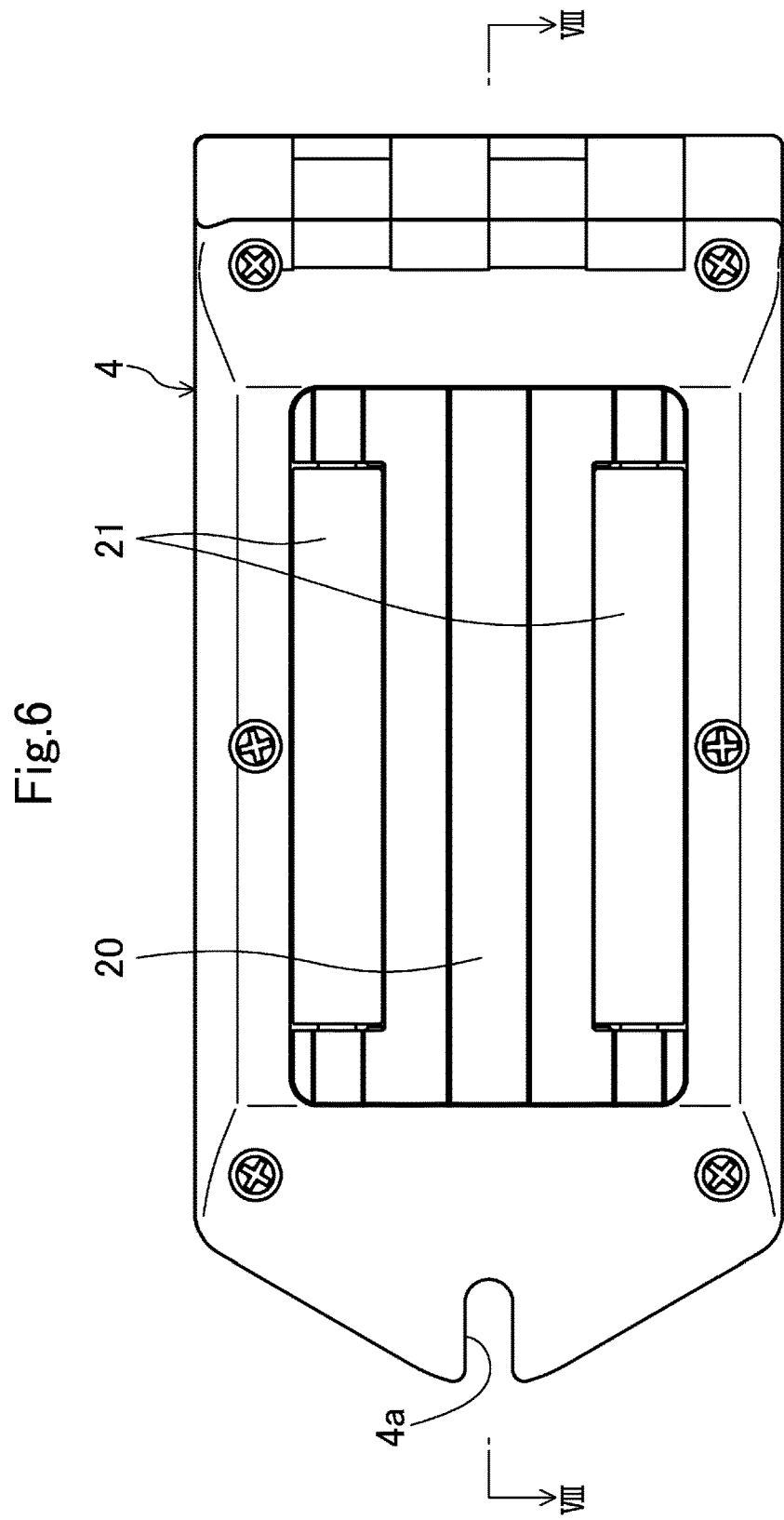
FIG. 6 is a bottom view of a second casing.
Figure 7:
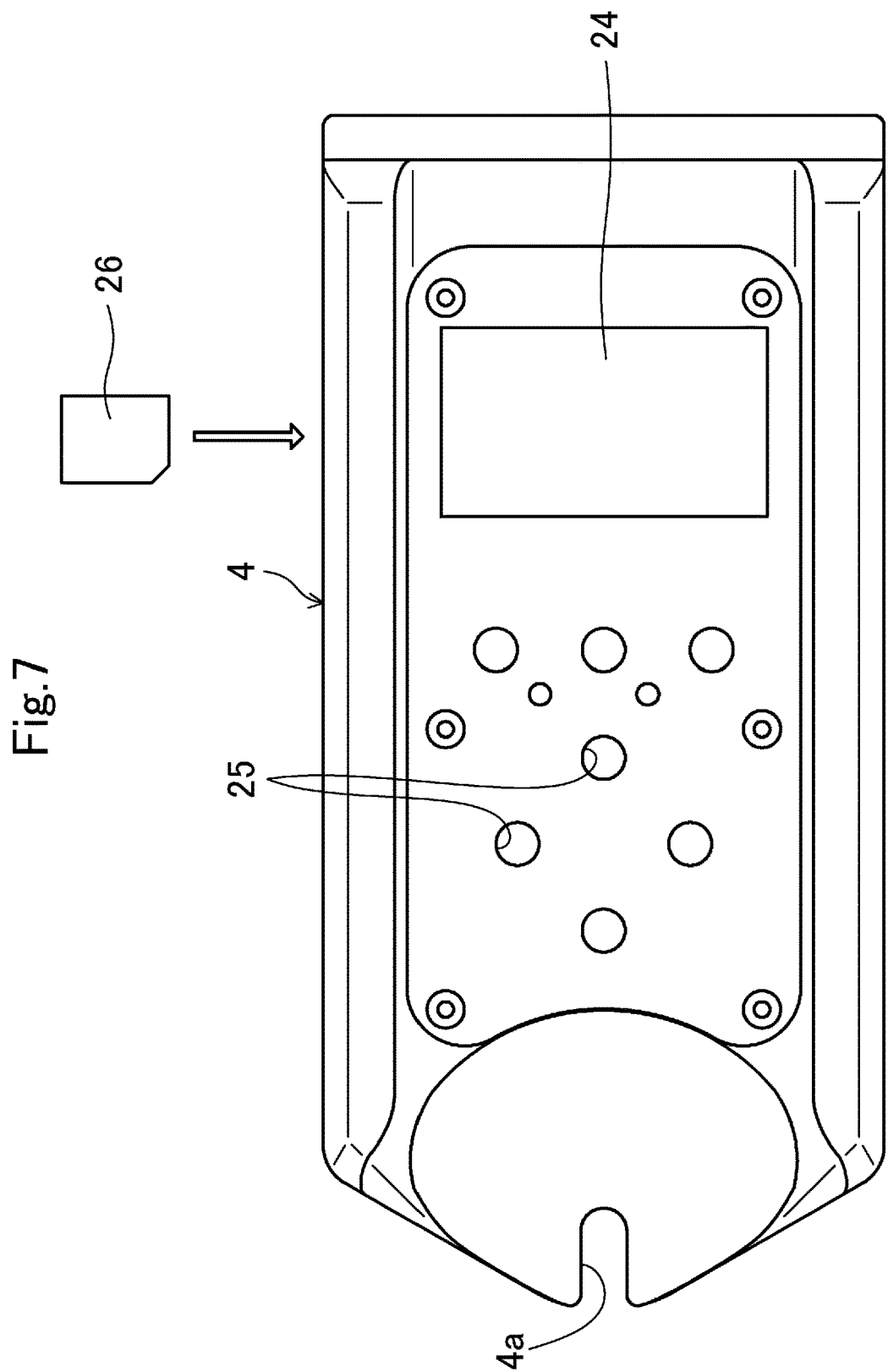
FIG. 7 is a plan view of the second casing.

As illustrated in FIGS. 2 and 4, a clamping rod 5 which is pivotable about a pivot shaft 6 is mounted to an end portion of the first casing 3 opposite to the hinge portion 2. The second casing 4 has a rod housing 4a which is formed as a recess capable of housing the clamping rod 5. A knob 7 is arranged at an end of the clamping rod 5. Tightening the knob 7 causes the first casing 3 and the second casing 4 to clamp the lashing belt B with a suitable force. In this configuration, the load cell 22 can measure a tension of, for example, the lashing belt B through clamping the lashing belt B between the first casing 3 and the second casing 4, and the measurement result can be displayed on the display portion 24 and/or stored on the circuit board 23 (the SD card 26).

Next, an exemplary method for measuring a tension using the tension measurement device 1 of this embodiment will be described below.

First, a user opens the first and second casing 3 and 4 around the hinge portion 2, and places a lashing belt B on the pair of first support rollers 10. The user then clamps the lashing belt B between the first and second casings 3 and 4. In this embodiment, since it is unnecessary to pass the lashing belt B around the pressing portion 20, the user can easily measure the tension by clamping the lashing belt B between the first and second casings 3 and 4, while the lashing belt B remains tightened to hold an object still.

Next, the user pivots the clamping rod 5 around the pivot shaft 6 to fit clamping rod 5 into the rod housing 4a of the second casing 4. The user then turns and tightens the knob 7 lightly. Then, the user operates the tightness-adjusting portion 13 to cause the pair of first support rollers 10 to apply a suitable force to the lashing belt B. Therefore, in this embodiment, even when lashing belts B having different thicknesses are to be measured, the pair of first support rollers 10 can press the respective lashing belt B with a suitable force.

Then, while checking the tension displayed on the display portion 24, the user further tightens or loosens the lashing belt B as necessary. The user may operate the operation portion 25 to store the measurement result in the SD card 26. Hence, the user can measure the tension of the lashing belt B, while tightening the lashing belt B. This makes the tension control significantly easy.

Figure 10:
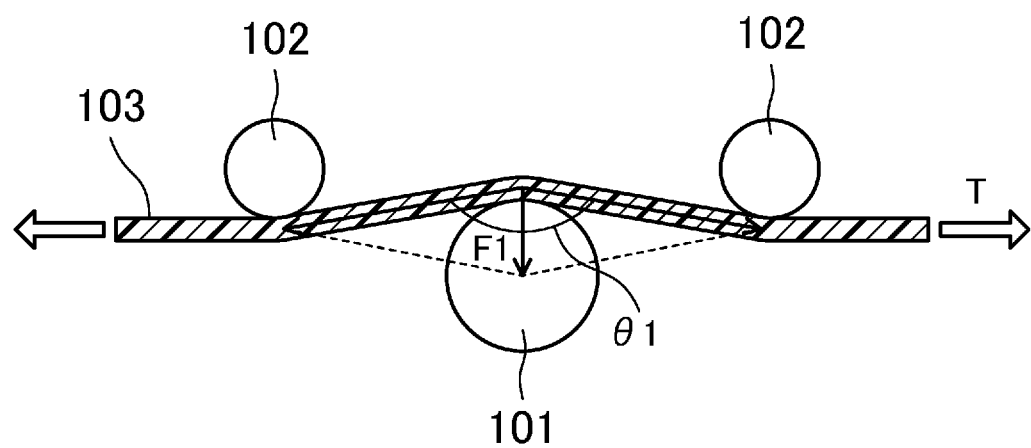
FIG. 10 corresponds to FIG. 1, and illustrates measurement of a tension of a thin belt using a known tension measurement device.
Figure 11:
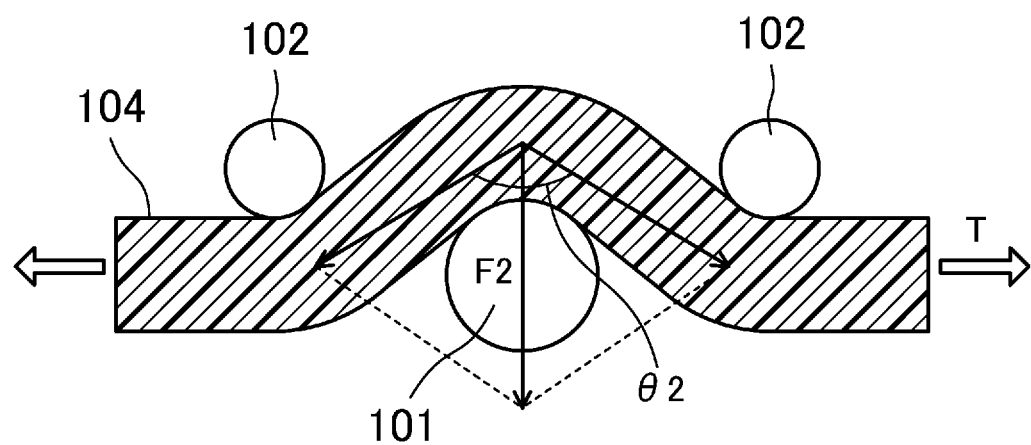
FIG. 11 corresponds to FIG. 1, and illustrates measurement of a tension of a thick belt using the known tension measurement device.

As can be seen from the foregoing description, in this embodiment, the pair of second support rollers 21 are arranged to face the pair of first support rollers 10 supporting the lashing belt B, and the lashing belt B is clamped between the support rollers 10, 21. As a result, even if the lashing belts B having different thicknesses are to be measured, the difference in the contact angle as shown in FIGS. 9 and 10 is less likely to occur, making it possible to reduce variation in the tension.

Moreover, in this embodiment, designing the pressing portion 20 to protrude toward the pair of first support rollers 10 by a suitable distance as illustrated in FIG. 1 enables measurement of a tension based on a component of force F applied to the pressing portion 20. Since the positional relationship between the pressing portion 20 and the pair of second support rollers 21 is constant, the contact angle θ that the pressing portion 20 forms with respect to the lashing belt B varies little irrespective of difference in thickness of the lashing belts B. Thus, the tension T of the lashing belt B can be accurately measured.

Further, since the tension measurement device 1, which incorporates therein a battery, does not require external electric power, the user can easily carry out tension measurement. Furthermore, if the measurement results are stored in the SD card 26, the data can be conveniently processed later using a personal computer or the like.

Therefore, with the tension measurement device 1 according to this embodiment, the tension can be accurately measured, irrespective of difference in thickness of the lashing belts B.

Other Embodiments

The above embodiment of the present disclosure may be configured as follows.

In the above embodiment, the measurement target is configured as the lashing belt B for use in packing or the like. However, the present disclosure is applicable to a drive belt and a conveyer belt.

The foregoing embodiments are merely beneficial examples in nature, and are not intended to limit the scope, application, or uses of the present disclosure.

What is claimed is:

1. A tension measurement device comprising:
   a pair of rotatable first support rollers;
   a pressing portion arranged to face a midpoint between the pair of first support rollers;
   a pair of rotatable second support rollers arranged to face the pair of rotatable first support rollers; and
   a load cell capable of measuring a load applied to the pressing portion,
   the tension measurement device being capable of measuring a tension of a measurement target by clamping the measurement target between the pair of rotatable first support rollers and the pressing portion, wherein
   on a same side of the measurement target as the pair of rotatable first support rollers, the tension measurement device is devoid of rollers between a first one of the pair of rotatable first support rollers and the pressing portion and between a second one of the pair of rotatable first support rollers and the pressing portion, the pressing portion protrudes, with respect to a phantom line connecting the pair of second support rollers to each other, toward the pair of first support rollers, and a positional relationship between the pressing portion and the pair of second support rollers is constant wherein the pair of first support rollers is rotatably supported in a first casing, the pair of second support rollers is rotatably supported in a second casing, and the tension measurement device is capable of measuring the tension of the measurement target by clamping the measurement target between the first and second casings.

2. The tension measurement device of claim 1, wherein the pair of first support rollers is rotatably supported on a roller-supporting member which is provided inside the first casing and movable with respect to the pair of second support rollers.

3. The tension measurement device of claim 1, wherein the first and second casings are coupled to each other via a hinge portion such that the first and second casings can be opened and closed.

4. The tension measurement device of claim 3, wherein a clamping rod is pivotably mounted to one of the first casing or the second casing, and a rod housing is provided for the other of the first casing or the second casing, the rod housing being configured to house the clamping rod when the first and second casings are closed.

5. The tension measurement device of claim 1, wherein the measurement target is a lashing belt, and the tension measurement device is capable of measuring a tension of the lashing belt by clamping the lashing belt between the first and second casings, while the lashing belt remains tightened to hold an object still.

6. The tension measurement device of claim 1, wherein the second casing has a display portion which is capable of displaying a result of measurement carried out by the load cell, and an operation portion through which the load cell is caused to carry out the measurement.

7. The tension measurement device of claim 6, wherein the first or second casing is capable of housing a battery which supplies power to the load cell, the display portion, and a calculator configured to calculate the tension of the measurement target from a value obtained by the load cell.

8. A tension measurement device comprising:
a pair of rotatable first support rollers;
a pressing portion arranged to face a midpoint between the pair of first support rollers; and
a load cell capable of measuring a load applied to the pressing portion, the tension measurement device being capable of measuring a tension of a measurement target by clamping the measurement target between the pair of first support rollers and the pressing portion, wherein a pair of rotatable second support rollers is arranged to face the pair of first support rollers, the pressing portion protrudes, with respect to a phantom line connecting the pair of second support rollers to each other, toward the pair of first support rollers, a positional relationship between the pressing portion and the pair of second support rollers is constant, the pair of first support rollers is rotatably supported in a first casing, the pair of second support rollers is rotatably supported in a second casing, the tension measurement device is capable of measuring the tension of the measurement target by clamping the measurement target between the first and second casings, and the first and second casings are coupled to each other via a hinge portion such that the first and second casings can be opened and closed.

9. The tension measurement device of claim 8, wherein the pair of first support rollers is rotatably supported on a roller-supporting member which is provided inside the first casing and movable with respect to the pair of second support rollers.

10. The tension measurement device of claim 8, wherein a clamping rod is pivotably mounted to one of the first casing or the second casing, and a rod housing is provided for the other of the first casing or the second casing, the rod housing being configured to house the clamping rod when the first and second casings are closed.

11. The tension measurement device of claim 8, wherein the measurement target is a lashing belt, and the tension measurement device is capable of measuring a tension of the lashing belt by clamping the lashing belt between the first and second casings, while the lashing belt remains tightened to hold an object still.

12. The tension measurement device of claim 8, wherein the second casing has a display portion which is capable of displaying a result of measurement carried out by the load cell, and an operation portion through which the load cell is caused to carry out the measurement.

13. The tension measurement device of claim 12, wherein the first or second casing is capable of housing a battery which supplies power to the load cell, the display portion, and a calculator configured to calculate the tension of the measurement target from a value obtained by the load cell.

* * * * *